United States Patent [19]
Goodrich

[11] 3,907,221
[45] Sept. 23, 1975

[54] RAM FLUID TURBINE

[75] Inventor: Joseph A. Goodrich, Torrance, Calif.

[73] Assignee: The Garrett Corporation, Los Angeles, Calif.

[22] Filed: Dec. 4, 1973

[21] Appl. No.: 421,567

Related U.S. Application Data

[62] Division of Ser. No. 75,905, Sept. 28, 1970, Pat. No. 3,835,641.

[52] U.S. Cl............................... 244/58; 60/39.18 C
[51] Int. Cl.².......................................... B64D 41/00
[58] Field of Search............. 244/53 R, 58; 416/175; 60/39.14, 39.18 C, 716

[56] References Cited
UNITED STATES PATENTS

| | | | |
|---|---|---|---|
| 2,622,390 | 12/1952 | Newton | 244/58 X |
| 2,815,188 | 12/1957 | Nelson | 60/39.18 C |
| 3,069,116 | 12/1962 | Ward | 244/58 |
| 3,149,678 | 9/1964 | Chilman et al. | 244/58 X |
| 3,587,766 | 6/1971 | Slade | 60/39.18 C |
| 3,633,411 | 1/1972 | Bass et al. | 244/58 |

Primary Examiner—Trygve M. Blix
Assistant Examiner—Barry L. Kelmachter
Attorney, Agent, or Firm—Albert J. Miller; Alan E. Kopecki

[57] ABSTRACT

Disclosed in an aircraft mounted ram fluid turbine adapted to be auxiliary driven by compressed gas from the aircraft propulsion engine. The compressed gas drives an auxiliary bladed rotor operably connected to the main bladed rotor of the ram air turbine.

7 Claims, 8 Drawing Figures

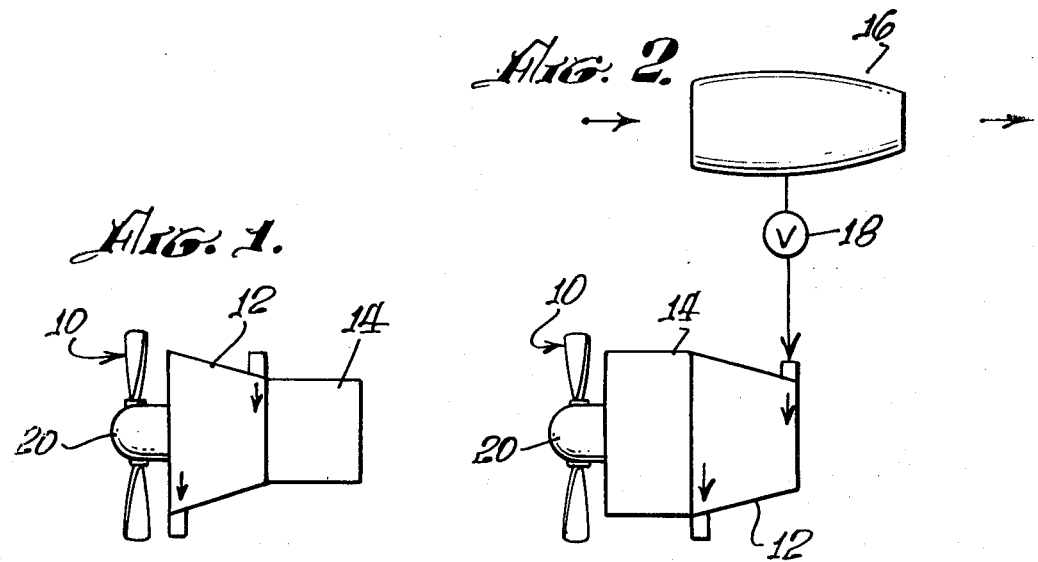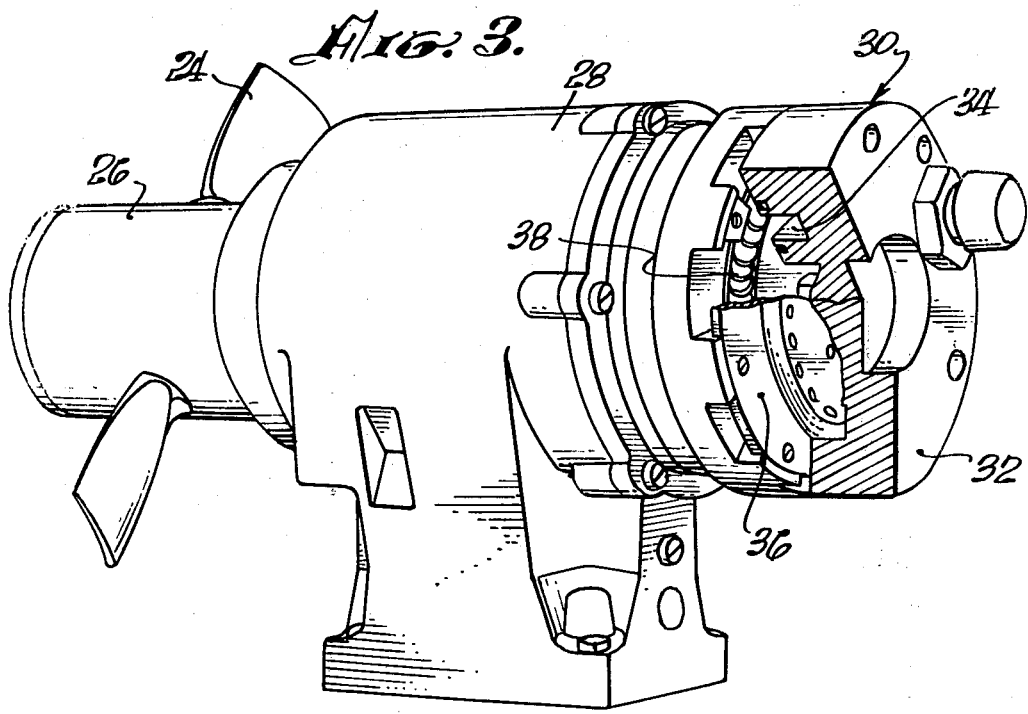

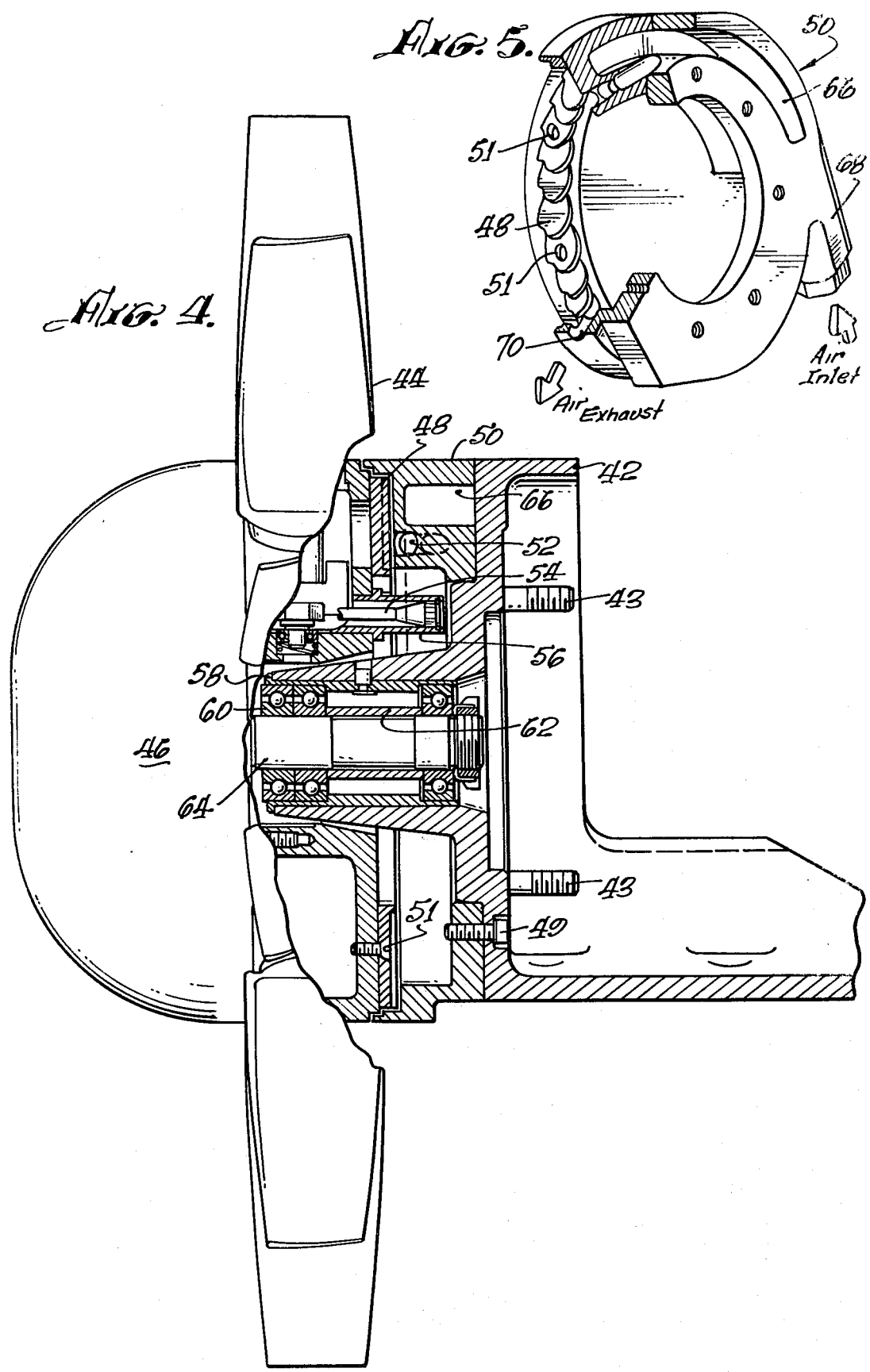

RAM FLUID TURBINE

This is a divisional of application Ser. No. 75,905 filed Sept. 28, 1970 now U.S. Pat. No. 3,835,641.

BACKGROUND OF THE INVENTION

Ram fluid turbines, that is, turbines having a bladed rotor extending into a moving fluid stream, have been used to provide electrical, hyraulic, electrohydraulic and shaft power for moving vehicles such as aircraft, re-entry vehicles, and missiles. One of the major drawbacks of such units is the fact that there is no convenient way to test their performance other than to flight test them or to test them in artificially created fluid streams such as wind tunnels.

SUMMARY OF THE INVENTION

A secondary or auxiliary turbine is provided with a conventional ram fluid turbine in order to facilitate the check out of the operating performance of the ram fluid turbine. A convenient source of power for the secondary turbine is compressed fluid or bleed air from a propulsion engine of the aircraft on which the ram fluid turbine would be utilized. The secondary turbine may be provided integral with the ram fluid turbine or located remote therefrom.

In addition, the secondary turbine can be utilized to enhance the performance of the ram fluid turbine by using engine bleed air or storable compressed fluid during flight.

BRIEF DESCRIPTION OF THE DRAWINGS

FIG. 1 is a schematic representation of the ram fluid turbine of the present invention.

FIG. 2 is a schematic representation of the ram fluid turbine of the present invention shown receiving bleed air from a propulsion engine.

FIG. 3 is an isometric view of a ram air turbine of the present invention partially cut away to show certain details of the secondary turbine.

FIG. 4 is a partial cross-sectional view of a ram air turbine of the present invention.

FIG. 5 is an isometric view, partially cut away, of the nozzle ring of the secondary turbine of FIG. 4.

DESCRIPTION OF THE PREFERRED EMBODIMENTS

Figure 6:
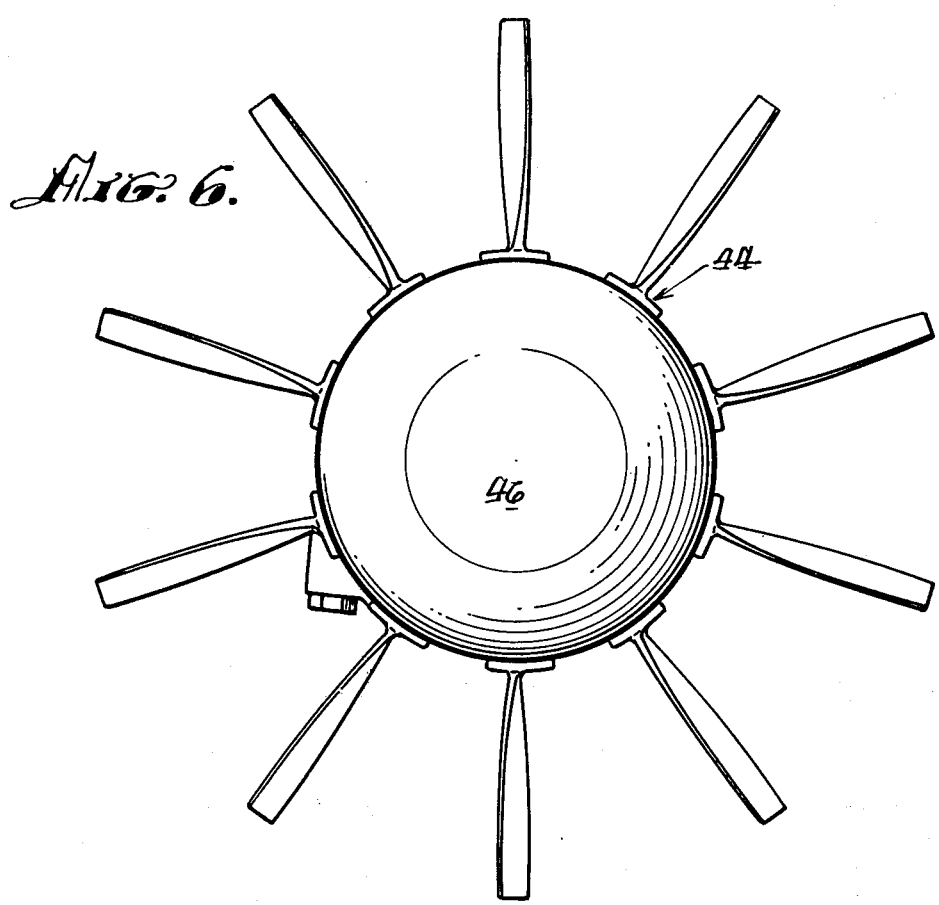
FIG. 6 is a front plan view of the ram air turbine of FIG. 4.

The present invention is schematically illustrated in its simplest form in FIGS. 1 and 2. Basically the invention comprises a ram fluid turbine 10, secondary or auxiliary turbine 12, and a power unit 14. As shown in FIG. 1, the secondary turbine 12 may be located intermediate between the ram fluid turbine 10 and power unit 14, or alternately, the secondary turbine 12 may be located adjacent the power unit 14 as shown in FIG. 2. In either case the secondary turbine may be driven by any compressed fluid such as compressed air or bleed air from an associated propulsion plant 16 such as a jet engine. A valve 18 would be provided between the propulsion plant 16 and the secondary turbine 12.

The ram fluid turbine 10 may be of any conventional type selected specifically for the type of application required. For example, the number of blades can be selected dependent upon such application requirements as starting torque, quick acceleration, rotational speed, close speed control, etc.

Speed control for the ram fluid turbine may be provided by any conventional governor 20. An example of such a governor, which provides fine speed control by a simple, reliable, torsion bar which changes blade pitch to regulate speed, is described in U.S. Pat. Nos. 2,777,524, 2,963,093, 2,967,572, and 2,970,652, all assigned to the same assignee as this application. Other lightweight governors would, however, be suitable.

The power unit 14 can be selected to provide different modes of power, for example, a fixed displacement piston pump can provide hydraulic power or a generator, such as a permanent magnet, axial air gap, brushless three-phase AC generator, can supply electrical power. Other types of power outputs, or combinations of power outputs, can be utilized.

By way of example, a ram air turbine is shown in FIG. 3 as comprising a propeller type bladed rotor 24, governor 26, electrical generator 28, and secondary or auxiliary turbine 30. The secondary turbine includes manifold 32 having inlet 34, nozzle ring 36, and turbine rotor 38. While a spot face secondary turbine is illustrated by having an inlet scroll or manifold and full admission nozzle, almost any type of turbine could be used in this application, including a Terry, impulse, or reaction type turbine depending upon its location with respect to the power unit and bladed rotor. As shown, the ram air turbine is mounted directly on the generator shaft as is the secondary turbine. The secondary turbine of FIG. 3 is mounted at one end of the generator. This is particularly appropriate for the modification of presently existing units.

An example of a secondary or auxiliary turbine interposed between the power unit and ram air turbine is shown in FIGS. 4, 5, and 6. A hydraulic pump (not shown) or other suitable power unit is mounted upon studs 43 projecting from housing 42 which rotatably supports the ram air turbine propeller type blade assembly 44 including governor 46. The secondary turbine rotor 48 is fixed to the back of the hub of the blade assembly 44 by bolts 51 while the secondary turbine nozzle ring 50 including manifold 66 and nozzles 52 is fixed to the housing 42 by bolts 49. An inlet 68 and outlet 70 are provided in the nozzle ring 50.

The blade assembly 44 is mounted upon a hollow shaft 64 rotatably supported by bearings 60 positioned within a bearing carrier 58 in the housing 42. The bearings 60 may be separated by a bearing spacer 62. The shaft 64 extends from the blade assembly 44 to the pump. The torsion bar 54 from the governor 46 extends into the blade assembly 44 through torsion bar sleeve 56.

The secondary turbine facilitates the ground check out of the ram air turbine. It is a simple matter to take a small portion of the bleed air from the aircraft engine or from any other convenient source of compressed air to operate the secondary turbine. There is very little horsepower required to drive the ram air turbine until it reaches a speed where the governor will start to control. At this point the blades of the ram air turbine will become loaded as the governor changes the blade pitch such that the blades will act as a brake. Thus, the ram air turbine rotating assembly, the governor, and the power unit (e.g., generator or pump) can be checked for mechanical integrity and proper operation.

Also, during operation of the ram air turbine in flight, bleed air from the aircraft engine can be utilized to drive the secondary turbine and thus enhance the power output of the ram air turbine. This is particularly desirable at low air speeds such as are encountered during landing of the aircraft. Power from the secondary turbine will complement that derived from the free airstream. A simple on-off valve is all that is required between the aircraft engine and the secondary turbine since the ram air turbine governor will control the power output. Alternately, a storable compressed fluid or gas generator can be used to drive the secondary turbine. This enables, in essence, the secondary turbine to perform a dual function, that is, one of ground check out and one of enhancement of ram air turbine performance.

To this point the present invention has been described with respect to a secondary or auxiliary turbine located integral with the ram air turbine and power unit. In some applications, however, it may be desirable to locate the secondary turbine remote from the ram air turbine. The ram air turbine may be stored within the aircraft's fuselage during take-off and positioned in the airstream at some later time when its operation is required. It may or may not be retracted before landing of the aircraft. In addition, there are applications in which the ram air turbine will always be in the airstream.

Figure 7:
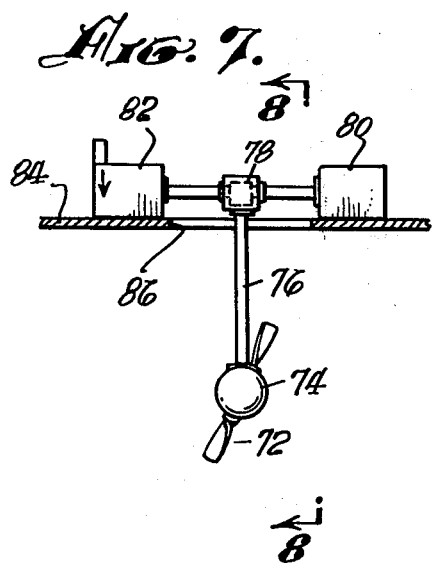
FIG. 7 is a schematic front view of a ram air turbine of the present invention showing the secondary turbine remotely located.
Figure 8:
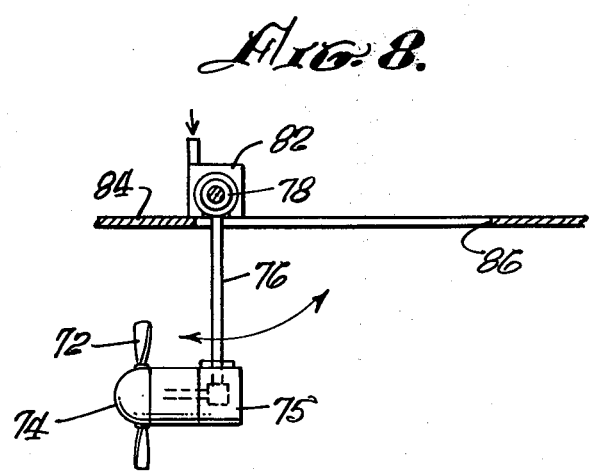
FIG. 8 is a sectional side view of the ram air turbine of FIG. 7 taken along line 8—8.

FIGS. 7 and 8 illustrate a ram air turbine with the secondary or auxiliary turbine remotely located from the ram air turbine. This would be particularly desirable when flexible connections to the secondary turbine might create difficulties, either with respect to the movement of the ram air turbine into and out of the free airstream or with respect to reliability. As shown, the ram air turbine 72, including governor 74 and primary gear box 75, projects out into the airstream. A strut 76 including a rotatable shaft pivotably supports the ram air turbine from a gear box 78 which extends between the power unit 80 and secondary turbine 82, both of which are mounted in the interior of an enclosure such as an aircraft fuselage 84. An opening 86 in the fuselage 84 permits the deployment of the ram air turbine 72 from within the fuselage 84.

While specific embodiments of the invention have been illustrated and described, it is to be understood that these embodiments are provided by way of example only and that the invention is not to be construed as being limited thereto, but only by the proper scope of the following claims.

What is claimed is:

1. In combination:
   a vehicle including a jet propulsion engine that provides a source of compressed gas;
   a rotary-driven power unit mounted on said vehicle;
   a ram air turbine including a main bladed rotor arranged to be placed in communication with a moving air stream, said main bladed rotor having a power output operably connected to said power unit to rotatably drive said power unit when said main bladed rotor is driven by a moving airstream;
   an auxiliary turbine including an auxiliary bladed rotor operably connected to drive said main bladed rotor and said power unit when driven by compressed gas from said jet propulsion engine; and
   means for conducting bleed gas directly from said jet propulsion engine to said auxiliary bladed rotor to drive said auxiliary rotor and said main bladed rotor, said main bladed rotor mounted at one end of said power unit, and said auxiliary turbine mounted at the other end of said power unit.

2. Apparatus according to claim 1 wherein said power unit comprises an electric generator.

3. In combination:
   a vehicle including a jet propulsion engine that provides a source of compressed gas;
   a rotary-driven power unit mounted on said vehicle;
   a ram air turbine including a main bladed rotor arranged to be placed in communication with a moving airstream, said main bladed rotor having a power output operably connected to said power unit to rotatably drive said power unit when said main bladed rotor is driven by a moving airstream;
   an auxiliary turbine including an auxiliary bladed rotor operably connected to drive said main bladed rotor and said power unit when driven by compressed gas from said jet propulsion engine; and
   means for conducting bleed gas directly from said jet propulsion engine to said auxiliary bladed rotor to drive said auxiliary rotor and said main bladed rotor, said main bladed rotor mounted at one end of said auxiliary turbine, and said power unit mounted at the other end of said auxiliary turbine.

4. In a vehicle having a propulsion engine providing a source of compressed gas, a valved conduit means for conducting said compressed gas, and a ram air turbine assembly, said ram air turbine assembly comprising:
   a. support means;
   b. a ram air turbine rotor rotatably mounted on said support means for rotating about an axis; said rotor having a hub and ram air blades projecting outwardly therefrom to be normally driven in a substantially free air stream;
   c. output shaft means;
   d. coupling means connecting said turbine rotor with said shaft means;
   e. said turbine rotor having auxiliary turbine blades affixed to the downstream side of said hub and being arranged in a circular pattern concentric with said axis;
   f. an auxiliary turbine nozzle ring means affixedly mounted upon said support means adjacent said auxiliary blades, said nozzle ring means including:
      inlet manifold means including means for communicating with said valved conduit means, and
      a plurality of nozzles arranged to receive compressed gas from said inlet manifold means and direct such gas toward said auxiliary turbine blades for driving said auxiliary blades and said ram air blades in a manner simulating normal operation in the absence of said substantially free air stream; and
   g. a power unit mounted upon said support means and operatively connected with said output shaft means to be driven thereby.

5. The combination of claim 4 wherein said auxiliary turbine blades are disposed between said ram air turbine and said power unit.

6. The combination of claim 4 wherein said power unit is a hydraulic pump.

7. The combination of claim 4 wherein said power unit is an electric generator.

* * * * *